Sept. 8, 1964    H. J. BICHSEL ETAL    3,148,266
METHOD OF ARC WELDING
Original Filed Aug. 27, 1958    3 Sheets-Sheet 1
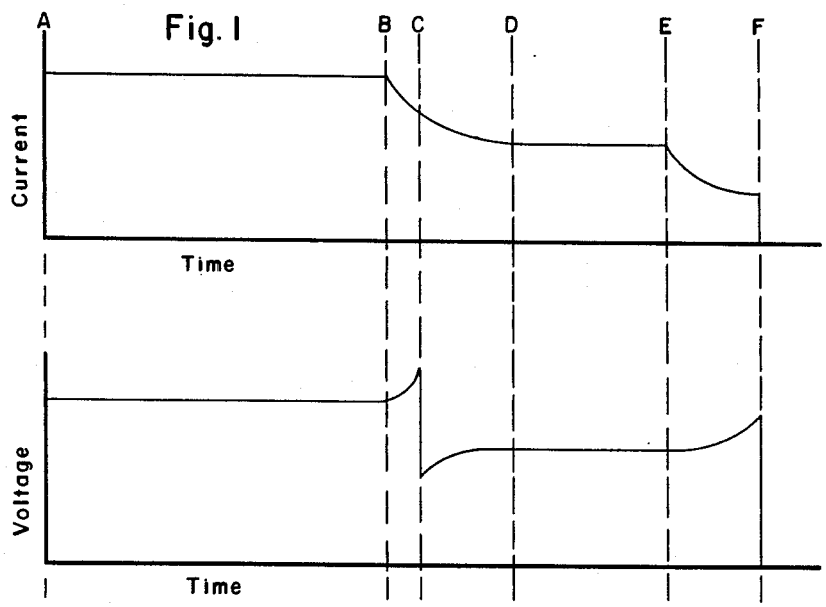
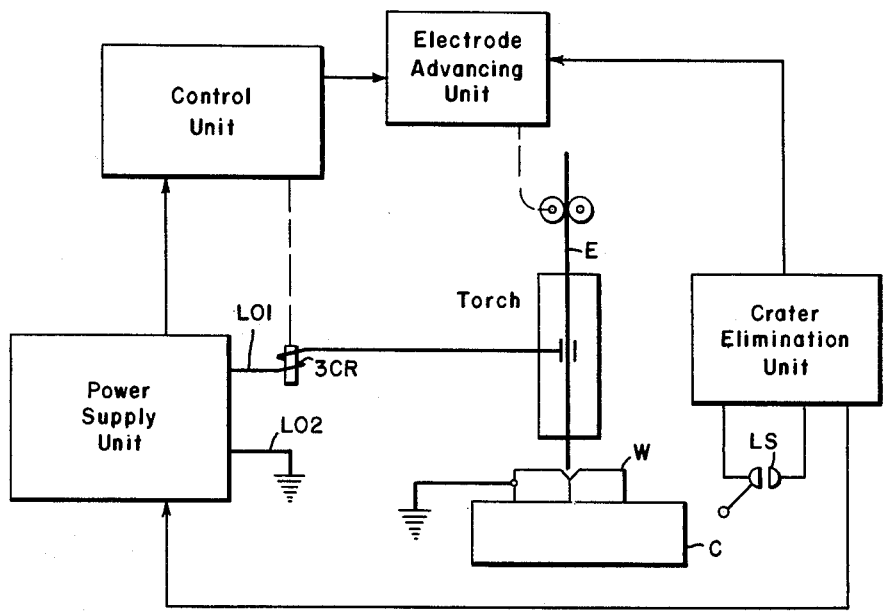
Fig. 2
INVENTORS
Harry J. Bichsel &
Floyd E. Adamson
BY
ATTORNEY

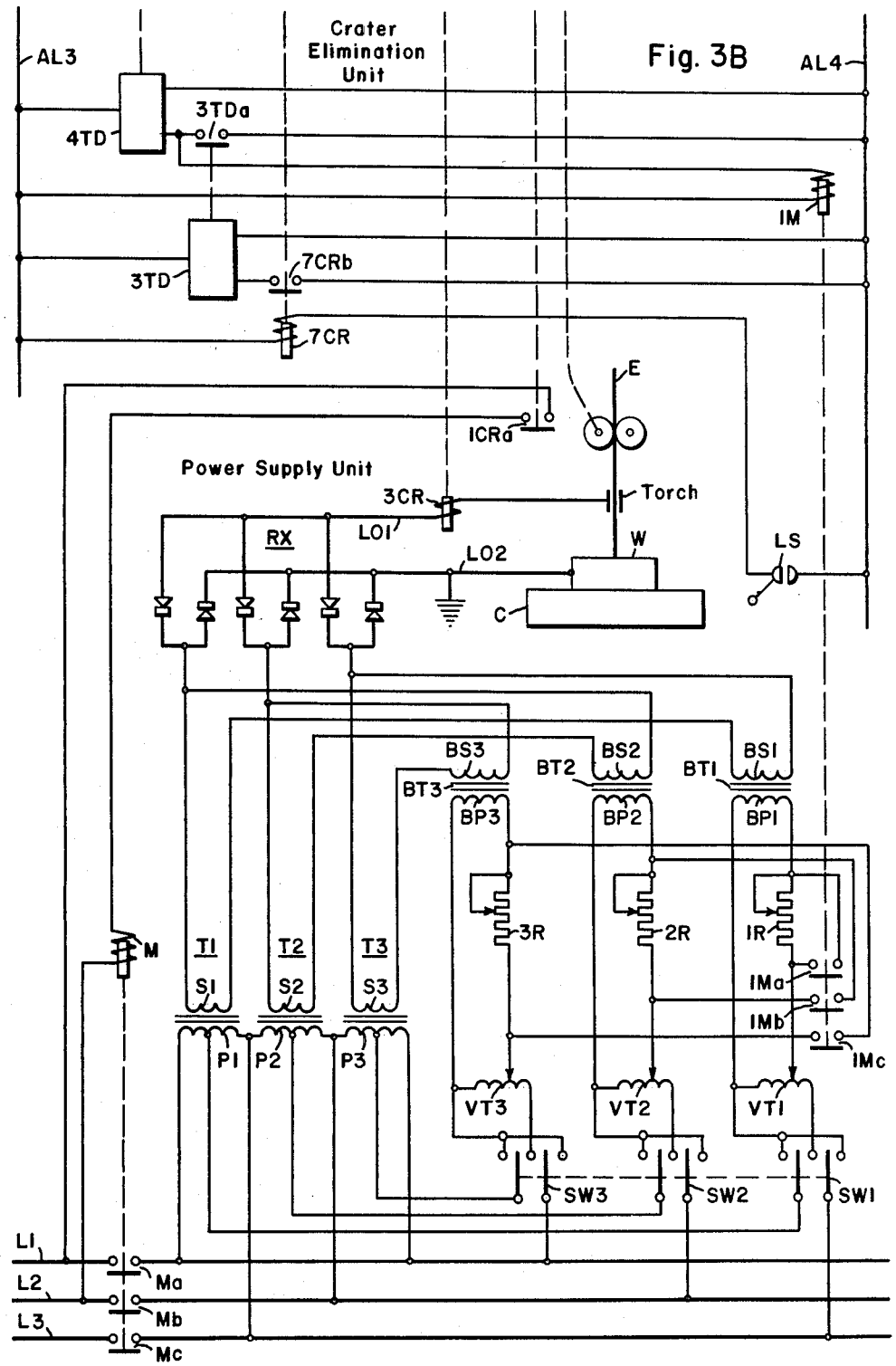

United States Patent Office

3,148,266
Patented Sept. 8, 1964

3,148,266
METHOD OF ARC WELDING
Harry J. Bichsel, East Aurora, and Floyd E. Adamson, Kenmore, N.Y., assignors to Westinghouse Electric Corporation, Pittsburgh, Pa., a corporation of Pennsylvania
Original application Aug. 27, 1958, Ser. No. 757,518, now Patent No. 3,069,533, dated Dec. 18, 1962. Divided and this application Feb. 28, 1962, Ser. No. 176,239
7 Claims. (Cl. 219—137)

This invention is a division of application Serial No. 757,518, filed August 27, 1958, now Patent No. 3,069,-533, granted December 18, 1962, and assigned to Westinghouse Electric Corporation. This invention relates to arc welding and has particular relationship to methods of automatic or semi-automatic arc weldings.

In automatic arc welding, it is essential that the formation of a crater at the end of the welded bead be prevented. Bichsel Patent 2,933,592 granted April 19, 1960, for Arc Welding Apparatus, typifies the teachings of the prior art on crater elimination. In this case, the formation of the crater is prevented by reducing the speed of the motor which feeds the welding electrode at a predetermined rate, thus causing the welding current to taper off so that the bead is terminated without producing a crater or burning a hole in the material to be welded. The method and apparatus disclosed in the Bichsel patent has, on the whole, been found to operate satisfactorily, but difficulty has been encountered in the practice of the Bichsel invention, particularly in situations in which fillet welds are produced automatically. Among the difficulties experienced are porosity and severe undercutting.

It is accordingly broadly an object of this invention to provide a method of welding, in the practice of which the formation of a crater shall be prevented under all reasonable circumstances regardless of the character of the welding operation.

Another object of this invention is to provide a method of automatic arc welding, in the practice of which the formation of a crater shall be prevented under all reasonable circumstances and for welds of all types.

This invention arises from the discovery that the difficulty encountered in attempting to eliminate craters in accordance with the teachings of the prior art is caused by the increase in arc voltage as the arc current tapers off during the interval at the end of a weld when the crater filling operation is taking place. It has been discovered that this increase in arc voltage increases the bead width at the end of the weld and causes the undercutting and the porosity observed.

In accordance with this invention, the undesirable properties at the end of a weld resulting from prior-art crater elimination are suppressed by reducing not only the welding current as the end of the weld approaches, but also the welding voltage. Specifically, in the practice of this invention as the end of a weld approaches, the welding current is first reduced to a lower magnitude, usually by reducing the speed at which the electrode is advanced. While this reduction in welding current is taking place, the welding-arc voltage is reduced, the timing of the reduction of the welding-arc voltage with respect to the reduction of the arc current is such as to prevent stubbing (the arc is repeatedly extinguished and the electrode bounces against the work) of the electrode to the work. Following the reductions in the current and the voltage, the welding proceeds with these parameters reduced for a predetermined interval during which the carriage which is advancing the work is stopped. Thereafter, the speed at which the electrode is advanced is tapered off further reducing the current. Then the arc supply circuit is opened removing the potential from the electrode and the work and extinguishing the arc. The arc is thus extinguished after the arc current reaches a low magnitude but while it is still flowing, but at the instant of extinction the supply circuit is open and and the potential between the electrode and the work is zero.

Another aspect of the invention is a power supply unit particularly suitable for practicing the method described above. This unit includes impedances in the booster primaries which are shunted out during normal welding but are effective during the crater elimination interval to reduce the arc voltage.

In the practice of this invention as just described, it has been found that the undercutting and the porosity at the end of a weld which occur in the practice of the teachings of this prior art, are prevented.

The novel features considered characteristic of this invention are described generally above. The invention itself, both as to its organization and as to its method of operation, together with additional objects and advantages thereof, will be understood from the following description of a specific embodiment taken in connection with the accompanying drawings, in which:

FIGURE 1 is a graph illustrating the practice of this invention;

FIG. 2 is a block diagram of apparatus used in the practice of this invention; and FIGS. 3A and 3B together are a circuit of apparatus in accordance with this invention.

Figure 3A:
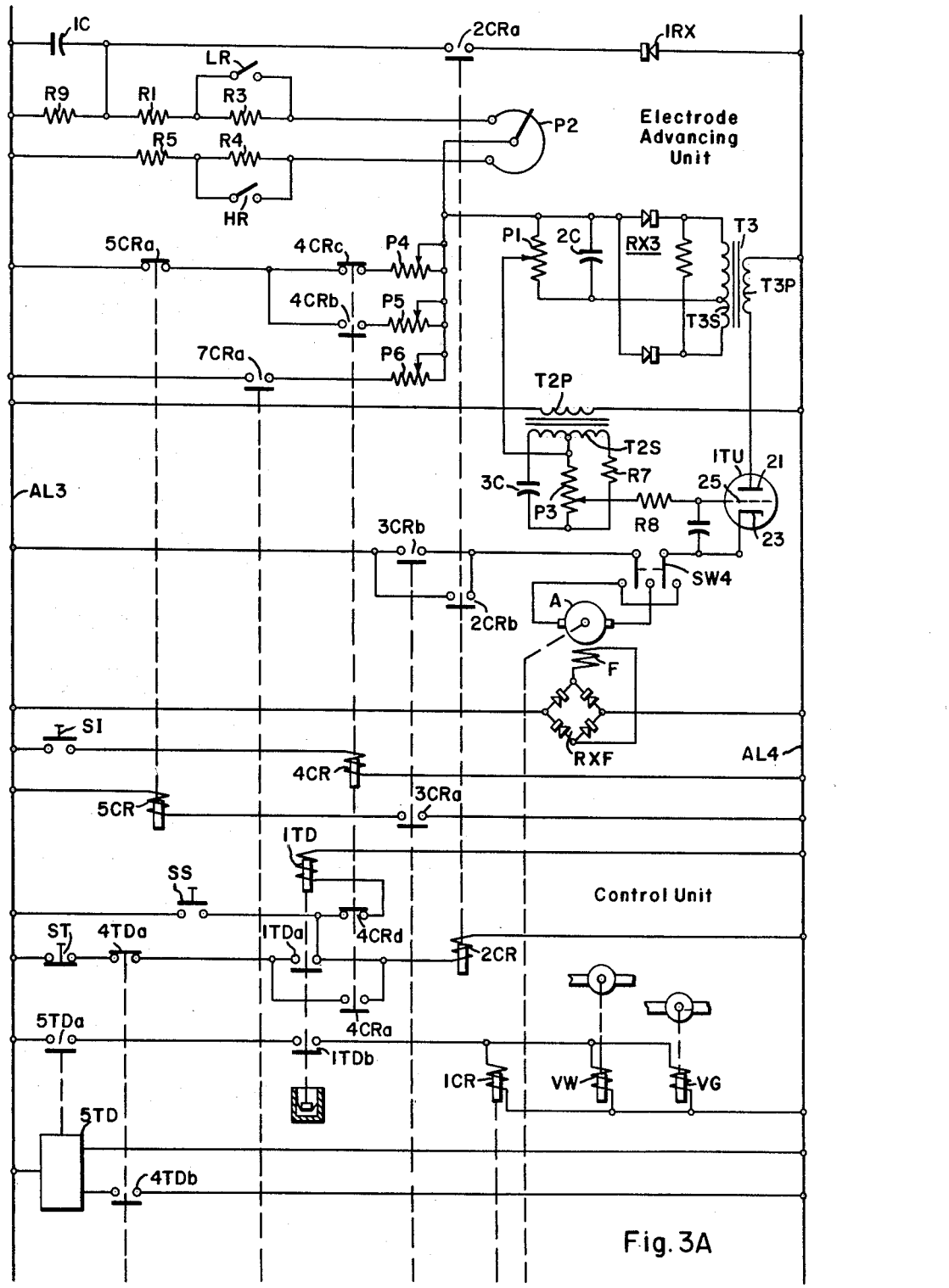

In FIG. 1, the method in accordance with this invention is shown graphically. This figure includes two graphs, an upper graph I in which the arc current is plotted as a function of time and a lower graph II in which the arc voltage is plotted as a function of time. In graph I, arc current is plotted vertically and time horizontally. In graph II, arc voltage is plotted vertically and time horizontally. The vertical axes in each case represent the starting of an automatic welding operation. Points along the horizontal axes in graphs I and II at the same distance from the vertical axis represent the same instants of time. Instants at which various events in the practice of the method according to this invention occur are labeled A, B, C, D, E and F at the top of FIG. 1.

The welding operation starts at the instant A and continues until instant B in normal manner. During this time, the welding current is represented by the horizontal line above the time axis in graph I and the arc voltage by the horizontal line above the time axis in graph II. At instant B, the carriage which is advancing the work reaches a point near the end of the weld and the crater-elimination process starts. At the start of this process the welding current is reduced. Usually, this is accomplished by reducing the speed of the electrode drive to a magnitude lower than the normal welding speed. The reduction in the welding current is represented by the droop in the curve of graph I between points B and C. There is a corresponding rise in arc voltage represented by the rising portion of the voltage curve of graph II. While the welding current is decreasing at instant C, the arc voltage is abruptly decreased. The time interval B–C should be set so that at instant C the current has reached a magnitude at which the weld does not have a tendency to stub.

Following the decrease in the arc voltage at C, the arc current continues to decrease until it levels off and the arc voltage increases to a substantially constant magnitude which is appreciably lower than the normal welding arc voltage. While this leveling off of the arc current and the arc voltage is taking place, the carriage stops at instant D and the arc now plays over the end of the weld. The metal which is now deposited fills in the crater. The mode of operation governed by the setting at instant B with respect to current and the setting at instant C with respect to voltage continues until instant E. At this point, the arc current is further reduced, preferably by reducing the speed of the electrode at a predetermined rate, for example as disclosed in Bichsel Patent 2,933,592. The reduction continues until the arc is extinguished by the opening of the arc-supply circuit. This reduction in current is represented by the downward loop between E and F, the arc being extinguished at instant F. As the arc current decreases there is a corresponding rise in arc voltage which is shown by the upward sweep of the lower curve between points E to F. At point F, where the arc supply is opened there is an abrupt drop of both the arc current and the arc voltage to zero and the welding operation is at an end; a weld with the crater eliminated has been produced.

Apparatus for carrying out the above-described process is shown in FIGS. 2 and 3A, 3B. The apparatus includes a POWER SUPPLY UNIT, a TORCH, a CONTROL UNIT, an ELECTRODE ADVANCING UNIT, and a CRATER ELIMINATION UNIT. The division of the apparatus into the above listed five units is in the basis of function and not on the basis of the physical location of the units.

The POWER SUPPLY UNIT is preferably of the so-called constant-potential type, but may also be of the controlled droop type as disclosed in an application Serial No. 757,513, filed August 27, 1958 to Floyd E. Adamson and Martin Rebuffoni, and assigned to Westinghouse Electric Corporation. This UNIT is supplied from polyphase conductors L1, L2 and L3, which may be connected to a commercial polyphase source through the usual circuit breakers or disconnects (not shown). The unit includes a plurality of main supply transformers T1, T2, T3, each having a primary P1, P2, P3 and a secondary S1, S2, S3. In the usual practice of this invention, the primaries are provided with sections so that the transformers may be operated from 220 or 440, or even higher, voltages. The primaries P1, P2, P3 are adapted to be connected in a delta network and to be energized from conductors L1, L2, L3 through front contacts Ma, Mb, Mc of a contactor M. The coil of contactor M is adapted to be connected between conductors L1 and L2 through the back contact 1CRa of relay 1CR in the CONTROL UNIT.

Across a portion of each primary P1, P2, P3, the primary of a variable autotransformer VT1, VT2, VT3 is connected through a reversing switch SW1, SW2, SW3. The POWER SUPPLY UNIT also includes a plurality of booster transformers BT1, BT2 and BT3, each transformer having a primary BP1, BP2, BP3 and a secondary BS1, BS2 and BS3. Each primary BP1, BP2, and BP3 is connected between the adjusting arm and a fixed terminal (the secondary) of the associated variable transformers VT1, VT2, VT3 through a variable resistor 1R, 2R and 3R, respectively. Each resistor is shunted out by an associated back contact 1Ma, 1Mb, 1Mc of a contactor 1M. The resistors 1R, 2R, 3R could also be inductors or other impedances. The main secondaries S1, S2, S3 and the booster secondaries BS1, BS2 and BS3, respectively, are connected in a delta network in series. This delta network supplies a rectifier RX connected to its apices; the output terminals LO1 and LO2 of the rectifier RX are adapted to be connected to the welding electrode E and the work W.

The transformers T1, T2, T3, the variable transformers VT1, VT2, VT3 and the booster transformers BT1, BT2, BT3 and the rectifier RX are of low impedance so that over the range of currents of a welding operation the volt-ampere characteristic is substantially constant. In certain situations as disclosed in the above-mentioned Adamson and Rebuffoni application, it may be desirable to introduce a controlled droop in the volt-ampere characteristic and for this purpose a POWER SUPPLY UNIT having an impedance such as to produce this droop is provided. A droop in the static volt-ampere characteristic of about 2 to 5 volts per hundred amperes has been found advantageous.

The output conductor LO2, which is adapted to be connected to the work W, is usually grounded. The output conductor LO1, which is adapted to be connected to the electrode E, includes a loop which serves as the coil of a current relay 3CR, the contacts 3CRa and 3CRb of which are connected in the CONTROL UNIT.

The TORCH may be of any suitable type available in the art. A typical TORCH is shown in Bichsel Patent 2,813,193. Briefly stated, the TORCH includes facilities for advancing the electrode E towards the work and for transmitting a shield of gas, for example, an inert gas or carbon dioxide around the arc. The TORCH is cooled by a cooling fluid, such as water. The TORCH also includes a brush 11 of one type or another for connecting the electrode E to conductor LO1 of the POWER SUPPLY UNIT.

Where this invention is practiced in connection with automatic welding, the work is usually mounted under the TORCH on a carriage C by which it is advanced with respect to the electrode so that a welded seam is produced. The carriage is driven by a motor (not shown).

The CONTROL UNIT is supplied from conductors AL3 and AL4 which may be connected to the usual 110 volt 60 cycle commercial supply through disconnect fuses or circuit breakers (not shown). This UNIT includes the relay 1CR which may be mounted in the POWER SUPPLY UNIT cabinet, relays 2CR, 4CR and 5CR and a time delay relay 1TD. The CONTROL UNIT also includes a start push button SS, a stop push button ST and an inch push button SI. The shielding gas and water are controlled by valves (not shown) which, in turn, are controlled by solenoids VG and VW connected to the CONTROL UNIT.

The relay 2CR includes front contacts 2CRa and 2CRb. The relay 4CR includes front contacts 4CRa, 4CRb and back contacts 4CRc and 4CRd. The relay 5CR includes a back contact 5CRa. The relay 1TD includes an instantaneous front contact 1TDIa and a timing contact 1TDb. The contact 1TDIa is closed instantaneously when the coil of relay 1TD is supplied with current and drops out instantaneously when the supply of current to this coil is interrupted. The contact 1TDb is closed instantaneously when the coil of the relay 1TD is supplied with current, but drops out only after a predetermined delay when the current through the coil of 1TD is interrupted. The relay 1TD is included in the CONTROL UNIT for use in situations in which the apparatus is used with other crater elimination facilities than that of this invention. Where the present crater elimination is required the timing function of relay 1TD is taken over by 5TD which has a shorter timing interval and is more precise in timing than 1TD.

The coil of relay 1CR and the solenoids VG and VW are adapted to be connected between conductors AL3 and AL4 through front contact 1TDb and a back contact 5TDa of a timer 5TD in the CRATER ELIMINATION UNIT. The coil of relay 2CR is adapted to be connected between conductors AL3 and AL4 through stop button ST a back contact 4TDa of a timer 4TD in the CRATER ELIMINATION UNIT and either of contacts 1TDIa or 4CRa. The coil of relay 4CR is adapted to be connected between conductors AL3 and AL4 through inching switch SI. The coil of relay 5CR is adapted to be connected between conductors AL3 and AL4 through front contact 3CRa. The coils of the relay 1TD is adapted to be connected between conductors AL3 and AL4 through start button SS and back contact 4CRd and to be locked in through the stop button ST and the front contact 1TDIa.

The ELECTRODE ADVANCING UNIT includes a motor having an armature A and a field winding F. The armature A is connected mechanically to drive the electrode E. The field winding F is supplied from conductors AL3 and AL4 through rectifier RXF.

The motor is supplied through, and its speed is controlled by, a thyratron 1TU. This thyratron has an anode 21, a cathode 23 and a control electrode 25. The anode 21 of the thyratron is connected to conductor AL4 through the primary T3P of a current transformer T3. The cathode 23 is adapted to be connected to conductor AL3 through a reversing switch SW4, the armature A and either front contact 2CRb or 3CRb. The potential across armature A is impressed in the control circuit of thyratron 1TU. In addition, the algebraic sum of a bias potential, a phase shifted alternating-current potential and a direct-current potential, depending on the current conducted by the armature, are impressed in this control circuit.

The bias potential is derived from a capacitor 1C which is adapted to be charged from conductors AL3 and AL4 through a rectifier 1RX and the front contact 2CRa. The capacitor 1C is shunted by a resistor R9. For the purpose of controlling the speed during normal operation, the capacitor is also shunted by a resistor network, including a resistor R1, resistor R3, variable resistor P2, a resistor R4 and a resistor R5. Resistor R3 may be shunted out by a range switch when the apparatus is set for the high range of speeds and resistor R4 by the switch when the apparatus is set for the low range of speeds. During normal operation the bias is derivable from variable resistor P2. During starting the bias is derivable through a variable resistor P4 which is connected between resistor P2 and conductor AL3 through back contacts 4CRc and 5CRa. When the ELECTRODE ADVANCING UNIT is used in a manual operation the bias for inching is controlled by variable resistor P5 which is adapted to be connected between P2 and conductor AL3 through front contact 4CRb and back contact 5CRa. For the purpose of reducing the speed of the electrode E during the crater elimination interval the bias is derivable from variable resistor P6. P6 is adapted to be connected between P2 and conductor AL3 through a front contact 7CRa of a relay 7CR in the CRATER ELIMINATION UNIT.

The potential dependent on the current conducted by the armature A is impressed on a capacitor 2C shunted by a variable resistor P1. This potential is derived from the secondary T3S of the current transformer T3 through a rectifier RX3. The phase shifted alternating potential is derived from a phase-shift network including a resistor R7 and a capacitor 3C connected across the secondary T2S of a transformer T2. The phase shifted potential is derived from a variable resistor P3 connected between the intermediate tap of the secondary T2S and the junction of the capacitor 3C and the resistor R7.

The control electrode of 1TU is connected to the junction of the variable resistors P2, P4 and P5 through a grid resistor R8, the resistor P3 and the resistor P1. The connection of the various potentials in the control circuit is such as to maintain the armature A at the proper speed. Specifically, the potential of the armature A is impressed so as to decrease the conduction of 1TU, the bias potential is impressed so as to counteract the potential of armature A, and the armature current dependent potential is similarly connected to counteract the potential of armature A. Usually the variable resistor P1 is set so that the potential which is introduced through it in the control circuit of 1TU tends to effect IR drop compensation.

The CRATER ELIMINATION UNIT includes in addition to the contactor 1M, the timers 4TD and 5TD and the relay 7CR, a timer 3TD. The relays 3TD, 4TD and 5TD may be standard Westinghouse 1A timers. The CRATER ELIMINATION UNIT also includes a limit switch LS which is actuable by the carriage C as the carriage approaches the position corresponding to the end of a weld. The timers 3TD, 4TD and 5TD are adapted to be energized from conductors AL3 and AL4. These relays are normally quiescent. The relay 3TD has a front contact 3TDa. The relay 4TD has, in addition to the back contact 4TDa, a front contact 4TDb. The relay 7CR has in addition to the front contact 7CRa, a front contact 7CRb.

The coil of relay 7CR is adapted to be connected between conductors AL3 and AL4 through the limit switch LS. The timing of timer 3TD is adapted to be initiated by the closing of contact 7CRb. The timing of relay 4TD is adapted to be started by the closing of contact 3TDa which closes when 3TD times out a predetermined time after the timing of 3TD starts. The timing of relay 5TD is initiated by the closing of front contact 4TDb. This contact is closed a predetermined time interval after the timing of relay 4TD is started. The contact 5TDa is opened a predetermined time interval after the timing of relay 5TD is started. Relay 5TD times out in a shorter interval than relay 1TD, that is, if the timing of relay 5TD is started at the same instant as the coil of relay 1TD is deenergized, contact 5TDa opens first and thereafter contact 1TDb opens. Contactor 1M is adapted to be connected between conductors AL3 and AL4 through contact 3TDa.

In the standby condition of the apparatus, the start button SS and the limit switch LS are open. Relays 1TD, 1CR and 2CR of the CONTROL UNIT are then deenergized. In addition, solenoids VG and VW are deenergized. In the CRATER ELIMINATION UNIT, relay 7CR is deenergized and relays 3TD, 4TD and 5TD are quiescent. Contactor 1M is also deenergized. In the POWER SUPPLY UNIT, contactor M is deenergized because contact 1CRa is opened. The inch switch SI is also open so that relay 4CR is deenergized. The ELECTRODE ADVANCING UNIT is then set with the variable resistor P4 determining the bias in the control circuit of thyratron 1TU and the armature A disconnected from conductor AL3. In this setting, the connection of the armature to the conductor AL3 and the closing of contact 2CRa would energize the motor to rotate at a speed such that the electrode E would advance towards the work W at a low speed.

To carry out a welding operation, the work W is set on the carriage C and the TORCH is positioned so that the electrode E is over the start of the joint to be welded. The reversing switches SW1, SW2, SW3 are set so that the booster potential supplied by the secondaries BS1, BS2 and BS3 has the proper polarity and the transformers VT1, VT2 and VT3 are set so that the booster potential is of the proper magnitude. In these settings, the full booster potential is interposed in the secondary delta of the SUPPLY UNIT since the resistors 1R, 2R, 3R are shunted out by the contacts 1Ma, 1Mb, 1Mc. Switch SW4 is set so that the armature A will rotate in the proper direction when the motor is energized. With the TORCH properly set with respect to the work and the carriage C ready to be moved, the start switch SS is closed. Relay 1TD is then energized and locked in through its contact 1TD1a. Relay 2CR is energized closing contact 2CRb, thus connecting the armature A to conductor AL3. Contact 2CRa is closed charging capacitor 1C so that bias potential may be supplied in the control circuit of 1TU, the magnitude of this bias potential is initially determined by P4. The electrode E is now advanced towards the work W at a low speed determined by the setting of the resistor P4.

Relay 1CR and solenoid VG and VW are energized through contact 1TDb which is closed. The energization of 1CR closes contact 1CRa which causes contactor M to be energized closing the supply circuit from conductors L1, L2, and L3 to transformers T1, T2, T3, VT1, VT2, VT3 and BP1, BP2, BP3. Potential determined by the settings of the booster transformers BT1, BT2 and BT3 now appears between conductors LO1 and LO2.

As the armature A rotates, the electrode E is advanced towards the work W near the start of the joint. When the electrode contacts the work W an arc is fired so that current flows through the arc through conductors LO1 and LO2. The current relay 3CR is now energized. At contact 3CRb, the armature A is connected to conductor AL3 independently of contact 2CRb. In addition, at contact 3CRa relay 5CR is energized, opening contact 5CRa. The bias for thyratron 1TU is now supplied through variable resistor P2 and is at a high positive magnitude so that the armature A rotates at the high speed set for operation. In an automatic welding system, the carriage C is advanced by a motor (not shown), which may be energized by another contact (not shown) of the 3CR relay or independently of 3CR relay. The work W is now advanced and the welding proceeds in normal manner.

As the end of the weld is approached, the carriage C actuates limit switch LS. Relay 7CR is now actuated. The closing of contact 7CR connects the variable resistor P6 in the control circuit of thyratron 1TU. P6 is so set as to impress a less positive bias than P2 in the control circuit. The speed of the armature A is then appreciably reduced, reducing the feed of the electrode E so that the arc current decreases as represented by the part of the current curve between B and C in FIG. 1. The arc current tends to level off to a constant magnitude determined by the setting of P6.

Contact 7CRb starts the timing out of 3TD. While the arc current is decreasing, timer 3TD times out. The closing of 3TDa then starts the timing out of timer 4TD. In addition, contactor 1M is opened and resistors 1R, 2R and 3R are connected in series with the primaries BP1, BP2, and BP3 in the POWER SUPPLY UNIT. The arc voltage is now substantially reduced as represented by the line between the loops of the arc voltage curve in FIG. 1 at instant C. The reduction of the arc voltage occurs at an instant when the current is sufficiently low to preclude stubbing. The arc current now levels off and the arc voltage rises by a small magnitude and levels off as represented by the portion of graphs I and II between instants C and E. During this interval, the carriage motor may come to a stop at instant D. After a predetermined time interval, timer 4TD times out. This closes contact 4TDb, starting the timing out of 5TD. In addition, contact 4TDa in the CONTROL UNIT is opened, deenergizing relays 1TD and 2CR. The instantaneous contact 1TD1a opens, but this does not affect contact 1TDb for the present; this contact remains closed. But relay 2CR drops out. Contact 2CRa is now opened so that the charge on capacitor 1C decays. This reduces the speed of the armature A at a predetermined rate. The arc current now decreases as shown by the right-hand loop of graph I. The arc voltage increases correspondingly. This continues until the arc is extinguished when 5TDa opens the primary contactor to cut the welding power. The timing of 5TD is set so that contact 5TDa opens before contact 1TDb. hTe opening of contact 5TDa resets contactor M deenergizing the POWER SUPPLY UNIT to extinguish the arc. Also by reason of the extinction of the arc, current relay 3CR is deenergized resetting relay 3CR and thus resetting the relay 5CR, the CONTROL UNIT and the ELECTRODE ADVANCING UNIT for a new operation. When the carriage C is returned to its initial position, limit switch LS is opened and relay 7CR, timers 3TD, 4TD, 5TD and contactor 1M are reset.

The invention disclosed herein makes feasible the production of sound crater-free joints by automatic welding. The crater fill at the end of the weld is not excessively undercut and is not porous. The following brief summary of the important features of the invention may help the understanding of the invention.

This invention relates to the elimination of craters at the end of a fully automatic weld. In the preferred practice of this invention a circuit is used which automatically reduces the welding current and welding-arc voltage at the end of the weld and at these reduced current and voltage magnitudes craters normally encountered at the end of a weld are filled.

In accordance with the teachings of the prior art, particularly in metal-arc, fully automatic welding with mild-steel welding electrodes with $CO^2$ gas shielding and a constant potential welder of flat or controlled drooping volt-ampere characteristic (see application Serial No. 757,513) a crater at the end of a weld has been a shortcoming. Prior art methods and equipment operated to fill the crater by stopping the relative motion between the work W and the electrode E while simultaneously tapering down the electrode drive motor speed. The welding arc between the electrode E and the work W was extinguished a predetermined time period after the electrode drive motor began to taper off. The proper time period was selected so that as the motor speed tapered off the electrode E was melted at a current which reduced in generally direct proportion to the taper of the motor speed and filled the crater. This system has operated highly satisfactorily in practice but is not suitable for all applications, particularly for fillet welds.

It has been discovered in arriving at this invention that the difficulties with the above-described method of eliminating craters is caused by the increase in arm voltage as the arc current decreases during the crater-filling interval. This condition arises particularly when the POWER SUPPLY UNIT has a controlled drooping volt-ampere characteristic, but it also arises when the POWER SUPPLY UNIT is of the ordinary constant potential type. The increase in arc voltage greatly increases the size of the bead at the end of the weld and particularly in fillet welding causes considerable undercutting. It also has the disadvantage of producing porosity at the termination of the weld.

These disadvantages are overcome in the practice of this invention by reducing both arc current and voltage in the crater filling operation at the end of the weld. FIG. 1 is a graph showing the pattern followed by the arc voltage and current in the practice of this invention. The letter references at the top of the graph refer to instants in the welding and crater elimination process. The interval between A and B is the usual welding time. At instant B, the limit switch LS on the welding fixture is closed by the carriage and initiates the crater elimination operation. The actuation of limit switch LS energizes relay 7CR. Contacts of relay 7CR connecting a shunting variable resistor P6 in the ELECTRODE ADVANCING UNIT reduces the positive direct-current bias on the thyratron 1TU, in turn reducing the electrode drive motor speed and the welding current. This reduction in welding current is shown in FIG. 1 by the droop between instant B nd E. Contact of relay 7CR initiates the timing of relay 3TD.

When 3TD times out in instant C of (FIG. 1) contactor 1M is actuated and resistors 1R, 2R, 3R are connected in circuit with the primaries of the booster transformers reducing the output voltage of the POWER SUPPLY UNIT. The time interval timed by 3TD is necessary to prevent the weld from stubbing out (the electrode freezing to the work) because of the reduction in arc voltage before the arc current is appreciably reduced.

The apparatus now continues to weld at reduced voltage and current and to fill the crater. The time interval between B and E is determined by the time intervals timed by 3TD and 4TD. Timer 3TD determines the time instant at which the arc voltage is reduced. The beginning of the timing out of 4TD starts at the instant when 3TD times out. Before 4TD times out, some time between instant B and E, for example at D, the motion between electrode E and work W is stopped, that is, the work carriage motor (not shown) is deenergized. When 4TD times out, the termination of the crater elimination begins. At this point, the ELECTRODE ADVANCING UNIT begins to reduce the welding current by the disconnection of the bias filter capacitor 1C. A contact of 4TD in series with 2CR in the CONTROL UNIT deenergizes 2CR and opens the normally open contact of 2CR in series with the bias rectifier 1RX. Disconnecting the bias rectifier allows the bias voltage to reduce exponentially, the motor speed reduces exponentially as does the welding current. At the same time the output voltage of the POWER SUPPLY UNIT begins to increase.

When 4TD times out, the timing out of 5TD starts. When 5TD times out, the POWER SUPPLY UNIT is deenergized by the opening of normally closed contact 5TD4. Relay 1TD in the CONTROL UNIT is set for a time period greater than 5TD and relay 5TD controls the cut-off of the POWER SUPPLY UNIT. In the practice of this invention, difficulty with high arc voltage, porosity and bead widening are not encountered because the weld is terminated from a lower arc voltage and current.

This invention then is not to be restricted except insofar as is necessitated by the spirit of the prior art.

We claim as our invention:

1. The method of arc welding work which comprises maintaining the arc current and the arc voltage at predetermined magnitudes to produce the weld, as the end of the weld approaches causing the arc current to be reduced at a predetermined rate to a predetermined magnitude, while said current is being reduced to said magnitude reducing said arc voltage, thereafter reducing said arc current while said arc voltage remains reduced, and then simultaneously reducing both said arc current and said arc voltage to zero.

2. The method of arc welding work with a consumable electrode and with apparatus including means for advancing said electrode, said advancing means being capable of being set to advance said electrode at a first speed and at a second speed, said second speed being substantially less than said first speed, said apparatus also including welding arc power supply means, said means being capable of being set to impress a first output potential or a second output potential between said electrode and said work, said second potential being substantially less than said first potential, the said method comprising setting said supply means to impress said first potential between said electrode and said work, striking a welding arc between said electrode and said work and advancing said electrode while said arc burns with said advancing means set to advance said electrode at said first speed to produce said weld, as the end of said weld approaches, setting said advancing means to advance said electrode at said second speed, thereafter setting said supply means to impress said second potential between said electrode and said work, thereafter setting said advancing means to reduce the speed of said electrode further, and then extinguishing said arc.

3. The method of arc welding work with a consumable electrode and a constant potential supply capable of being set a first output potential or a second output potential, said second potential being substantially smaller in magnitude than said first potential, the said method comprising setting said supply at said first potential, firing a welding arc, causing a weld to be produced by advancing said electrode towards said work at a predetermined speed while maintaining the current of said arc at a first magnitude such as to produce said weld, as the end of the weld approaches gradually reducing said arc current to a second magnitude lower than said first magnitude by reducing the speed at which said electrode is advanced towards said work, while said current is being reduced to said second magnitude setting said supply to said second potential, and thereafter reducing said arc current and are voltage to zero.

4. The method of crater elimination in the arc welding of work with a consumable electrode advanced towards said work at a predetermined speed during normal welding, by gradual reduction of said speed to gradually reduce the arc current during a time interval near the end of a weld, the said method being characterized by the reduction of the arc voltage to, and the maintenance of the arc voltage at, a magnitude substantially lower than the open circuit magnitude throughout said interval.

5. The method of crater elimination in the arc welding of work with a consumable electrode which is advanced towards the work at a predetermined speed during welding by drive means energized during normal welding at a predetermined level corresponding to said predetermined electrode speed, the said method being characterized by the step of reducing both the arc current and the arc voltage as the end of the weld approaches to substantially lower respective finite magnitudes, said arc current being reduced to said finite magnitude by energizing said drive means at a substantially lower but finite level than sad predetermined level to reduce the speed at which said electrode is advanced toward the work to a predetermined lower magnitude, said arc current and arc voltage remaining at said lower magnitude for a predetermined interval and metal being deposited at said lower magnitude during said interval to fill in the crater, and thereafter reducing both the arc current and the arc voltage to zero.

6. The method of arc welding work which comprises maintaining the arc current and the arc voltage at predetermined magnitudes to produce the weld, as the end of the weld approaches causing the arc current to be reduced at a predetermined rate to a predetermined magnitude, while said current is being reduced to said magnitude reducing said arc voltage, maintaining said arc current and said arc voltage at the reduced magnitude for a predetermined interval to deposit metal to fill in the crater, and then simultaneously reducing both said arc current and said arc voltage to zero.

7. The method of crater elimination in the arc welding of work with a consumable electrode which is advanced towards the work at a predetermined speed during welding by drive means energized during normal welding at a predetermined level corresponding to said predetermined electrode speed, the said method being characterized by the step of reducing both the arc current and the arc voltage as the end of the weld approaches to substantially lower respective finite magnitudes, said arc current and arc voltage remaining at said lower magnitude for a predetermined interval and metal being deposited at said lower magnitude during said interval to fill in the crater, and thereafter reducing both the arc current and the arc voltage to zero.

References Cited in the file of this patent

UNITED STATES PATENTS

| | | |
|---|---|---|
| 1,701,372 | Jefts | Feb. 5, 1929 |
| 2,152,785 | Blankenbuehler | Apr. 4, 1939 |
| 2,806,127 | Hackman | Sept. 10, 1957 |
| 2,897,343 | Regnauld et al. | July 28, 1959 |